Oct. 10, 1944. H. A. FREEDLANDER 2,359,837
COPY SLIDE RULE
Filed March 15, 1943
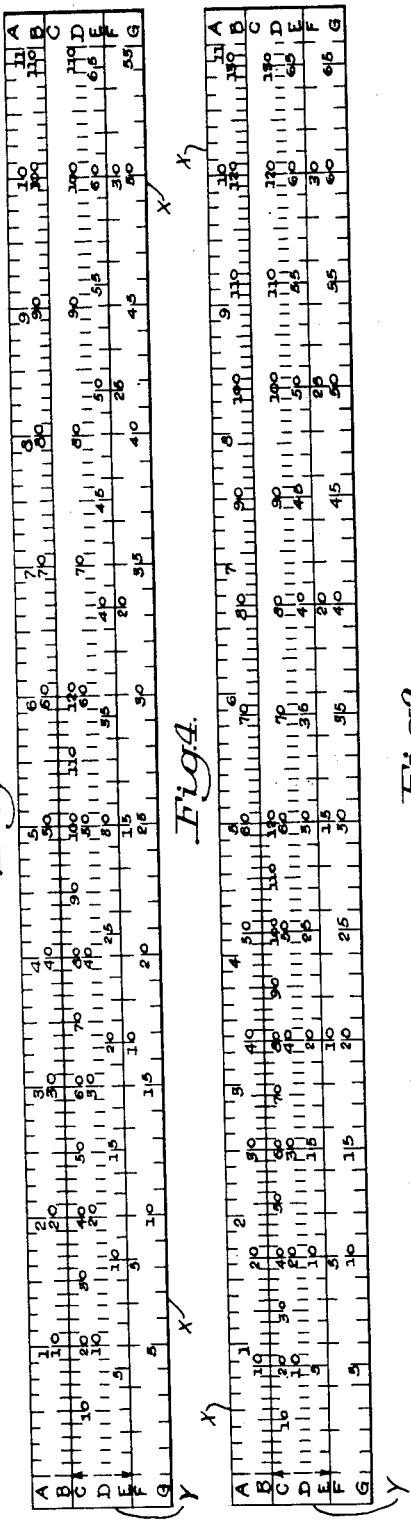
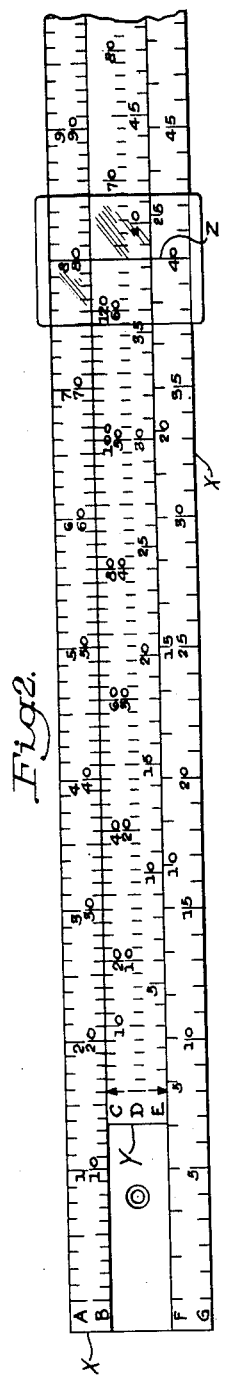
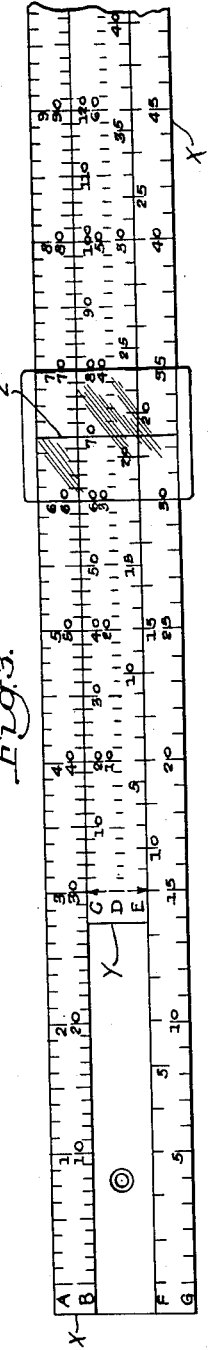
INVENTOR.
Harry A. Freedlander
BY Edward L. Lawrence
his Attorney.

Patented Oct. 10, 1944

2,359,837

UNITED STATES PATENT OFFICE 2,359,837

COPY SLIDE RULE

Harry A. Freedlander, Pittsburgh, Pa.

Application March 15, 1943, Serial No. 479,175

5 Claims. (Cl. 235—70)

This invention relates generally to calculators, and more particularly, to slide rules having scales for calculating the vertical and horizontal center of a page, right and left margins, spaced columns of digits, and other similar problems in setting up printed or typewritten matter.

The principal object of this invention is the provision of a slide rule for calculating the position of indicia for the purpose of setting it up in typed or printed form.

Another object is the provision of a slide rule upon which the exact horizontal or vertical center between paper edges, margins, or spaced points may be calculated and read directly. These calculations may be made for a typewriter regardless of the position that the paper is inserted on the platen in the carriage.

Another object is the provision of a slide rule upon which direct linear readings for the horizontal or vertical spacing may be made of typed or printed matter for the purpose of transposing linear measurements into horizontal or vertical typed or printed matter or vice versa.

Another object is the provision of a slide rule for calculating the margins, indentations, and tabulating position for setting the stops on a machine in producing typed or printed matter.

Another object is the provision of a slide rule for adding and subtracting the indicia and spaces used in setting up lineal typed or printed matter.

Another object is the provision of a slide rule for calculating horizontal and vertical problems of typed and printed matter wherein scales used for one problem are distinguished by color from the scales used for the other problem.

Another object is the provision of a slide rule having scales on one face thereof for calculating both horizontal and vertical positioning problems of typed and printed matter.

Another object is the provision of a slide rule for calculating typed or printed copy problems which may be used separate from or as a part of the machine producing the copy.

Another object is the provision of a slide rule which may be employed for calculating typed or printed copy problems using different sizes of type when definite facts are known.

Another object is the provision of a slide rule for calculating typed or printed copy problems without actuating the machine which is to be set in accordance with the results of the calculations, thereby eliminating wear and tear of the machine.

The slide rule is particularly advantageous for use in teaching typewriting students the subject of centering indicia on paper in a machine and reduces the percentage of errors usually made by mental calculations.

Another object is the provision of a slide rule for calculating typed and printed copy problems, wherein the scales have a definite relation with each other and are all progressive in character.

Other objects and advantages appear in the following description and claims.

In the accompanying drawing a practical embodiment illustrating the principles of this invention are shown wherein:

Fig. 1 is a plan view of a pica type slide rule comprising this invention showing the slide retracted.

Fig. 2 is a plan view of the slide rule positioned for a selected setting.

Fig. 3 is a plan view of the slide rule positioned for another setting.

Fig. 4 is a plan view of an elite type slide rule showing the slide contracted.

The slide rule disclosed herein is particularly adaptable for calculating problems in typing. It aids the typist in making calculations rapidly and accurately which results in well-balanced and neatly presented work that lends itself to faster reading and understanding.

Referring to Fig. 1 of the drawing, the slide rule is shown in its closed position. The body X of the slide rule is provided with four scales A, B, F and G. The first two scales A and B are at the top of the rule, and the last two F and G are at the bottom. The three intermediate scales C, D and E appear in this order on the slide Y. The slide rule is provided with a glass runner which has a vertical hairline Z.

The scale A is a regular linear scale of eleven inches with primary marks from 1 to 11 and secondary marks or divisions of one-eighth of an inch and may be used as a ruler.

The scale B is also laid out as an inch scale with eleven primary marks running progressively from 10 to 110. The secondary marks in the B scale are laid off in tenths of an inch. Since the slide rule shown in Fig. 1 is constructed principally for typing problems, there must be a selection as to the character of type to be employed. Ordinarily a typewriter has either pica or elite type. Pica type measures one-tenth of an inch in width and elite type one-twelfth. Thus the choice of secondary markings of one-tenth of an inch for the B scale makes this rule better suited for calculating problems for a typewriter having pica-size type, as illustrated in the rule shown in Fig. 1. A rule for the elite-size type is shown in Fig. 4.

However, with some factors known the problems for any size type may be calculated on either rule.

Scales C and D on the slide of Fig. 1 are marked off with the same number of divisions as scale B, each having secondary markings one-tenth of an inch for use with pica type which is governed by the selection of the divisions in scale B. The primary markings of scale C are twice that of scale B with a number appearing at every half-inch mark and the numbers progressing from 10 to 120 so that when scale C is placed opposite to scale B, as in Figure 1, the primary mark 60 of scale B is opposite to the primary mark 120 on scale C.

Scale D, the second scale on the slide, is the exact duplicate of scale B. The relative location of scales C and D is optional but it is believed preferable to have the latter in the center of the two scales on the slide.

The secondary markings of the B, C and D scales for the elite slide rule shown in Fig. 4 are laid out in divisions of one-twelfth of an inch in length. The primary markings may be based on the inch with the first mark being 12 and the others direct multiples thereof, or the primary markings may follow the decimal system which is the same scale as that employed on the slide rule in Fig. 1. The indicia of the former scale is not as easily read as the latter and for this reason the primary markings of these scales in Fig. 4 appear to be the same as that shown in the other views.

Scale E, the bottom scale on the slide Y, is also laid out with primary markings running progressively from 0 to 66 inclusive but set out in sequence of five divisions. The secondary divisions of scale E are each one-sixth of an inch, which is the height of both the pica and the elite type. Although the elite type is smaller in size than the pica type, the vertical spacing from the bottom of one letter to the bottom of the next letter thereabove is the same for both characters of type and in Figs. 1 and 4 these scales are the same.

Scale F is laid out on the body of the slide rule in secondary divisions of one-third of an inch in length, or half that of scale E, and may have primary markings running progressively from 0 to 33 inclusive but set out in sequences of five divisions.

Scale G, the bottom scale on the body 10, is one-half that of scales B and D. For pica type, the secondary divisions of this scale are in fifths of an inch but for elite type they would be in sixths of an inch, since scales B and D would be divided in twelfths as shown in Fig. 4, but the primary markings of each of the scales G are one-half that of the scales B and D in both views.

Thus the primary marking of each of the five scales A, B, C, D and G in Fig. 1 is one inch and the secondary divisions of B, C and D are one-tenth of an inch and G is one-fifth of an inch, and these scales are related to each other. The secondary divisions of scales E and F are also related. These related scales are fixed in accordance with the type to be employed. Except for the duplicate scales B and D, the related scales have a ratio of two to one for the purpose of dividing one-half of the difference between letters, lines, or points for the calculations of either the horizontal or vertical spacing problems.

The moduli of the B, C, D and G scales of both the pica and the elite type rules are the same. The C scale having the highest number of units per modulus may be said to have a modulus of $x$. It therefore follows that the B and D scale each have a modulus of $2x$ and the G scale a modulus of $4x$.

On the pica rule the linear scale A then has a modulus of $20x$ while on the elite type rule the modulus of this scale is $24x$.

The corresponding E and F scales on the pica rule have a modulus of $3\frac{1}{3}x$ and $6\frac{2}{3}x$ respectively, whereas on the elite type rule they have a modulus of $4x$ and $8x$ respectively. However if the E, F and A scales are to be considered alone, then E having the greatest number of units per modulus could be considered as having a modulus of $y$ and the F and A scales for both the pica and elite type rules would have a modulus of $2y$ and $6y$ respectively.

To quickly distinguish the groups of scales normally used with one another for the average problems, the scales A, E and F may be made black, scales B and C red, and scales D and G green. This coloring would permit the operator to quickly recognize the scales to be used together and thus simplify the operation of the slide rule.

Typewriters are ordinarily provided with one or more scales adjacent the platen around which the paper is rolled. The platen of the standard typewriter is approximately ten and one-half inches long, and the scale adjacent thereto is the same as scales B and D of the slide rule, being divided in fractions of one-tenth or one-twelfth of an inch, depending whether the type is pica or elite respectively. Since the secondary division of the rule shown in Fig. 1 is in tenths of an inch, the first group of problems will be worked for machines having pica type.

Ample room is provided at each end of the body X and the slide Y of the slide rule to permit the scale names A to G to be inserted thereon. In addition to the scale names, the initial and final marking of the scales on the slide Y are provided with arrow heads pointing in opposite directions to the scales on the body X of the slide rule. The arrow heads are referred to as the index of the scales C, D and E. If the problem involves the use of the scale C the upper arrow head pointing to scale B is the index. If scale D is involved both the upper and lower index arrow heads are used. If the problem involves the use of scale E the lower arrow head pointing to scale F is the index to which reference is made. It should be noted that the answers to problems are read from the hairline Z or the arrow head index.

*Center of paper*

Let it be assumed that a piece of paper approximately 4¾" wide is inserted in the typewriter with the left edge adjacent the reading 16 of the typewriter scale and the right edge adjacent 64.

The slide Y is moved to place the index of scale D adjacent 16 of scale B as shown in Figure 2, which is the reading of the left edge of the paper in the typewriter. The hairline Z of the runner is then moved along the body until it matches the reading of the right edge of the paper in the typewriter on scale D, which was 64.

The answer is then read under the hairline on scale G which is 40 as shown in Figure 2. Thus the operator has a direct reading of the center position of the paper relative to the typewriter scale as it was inserted in the typewriter. This problem is relatively simple but it has been found to save considerable time for the operator to calculate the center of the paper rather than to readjust the paper in the machine to a position where the readings are only of the primary order or zero. This is especially true when the paper or cards inserted consecutively are not of the same width. If the operator was to do this mentally, he would have to exercise three computation steps; first, take the difference between the readings of the edges of the paper to determine its width, the next step would be to divide the width in half, and the third step would be to add one-half of the width of the paper to the reading of the left edge. This illustrates the advantage of using the slide rule for making the calculation.

Line centering

Let it be assumed that the paper to be used is 8 inches wide, which is inserted in the typewriter with the left edge at zero on the typewriter scale and it is desired to center a line of typing containing the total number of 64 characters and spaces. The width of the paper may be measured by the slide rule or any ordinary lineal measuring rule. Since the paper is 8 inches wide, the hairline Z of the runner is placed at the 8 inch mark on scale A as shown in Figure 2. The reading under the hairline Z on scale B informs the operator that a paper of this width has 80 strokes or spaces to each line. Since the line in the problem had 64 strokes or spaces, the slide Y is moved until 64 on scale D comes under the hairline of the runner. The upper index of scale D reads 16 on scale B which is the difference between the number of strokes or spaces available and that required. The lower index of scale D points to 8 on scale G which represents the position that the operator should start to write the line of typing to center the 64 strokes or spaces.

On the other hand, if the 8 inch paper was inserted with its left edge at 10 instead of 0 on the typewriter scale, the operator determines the number of typing positions available by placing the hairline Z at 8 on scale A and reading 80 on scale B as previously stated. The index of scale D is then placed opposite to the left typewriter scale reading of 10 on scale B by moving the slide. The runner is then moved to place the hairline Z at 80 on scale D, the previously determined number of available positions. The total typewriter positions of 90 may be read on scale B under the hairline but this is not necessary to the computation. The slide is then moved to place 60 of scale D, the required number of strokes in the line to be centered, under the hairline as shown in Fig. 3. The answer or the position to start writing on the paper to center this line is read from scale G adjacent the lower index of scale D and is found to be 15, which is the corresponding position on the typewriter scale where the operator should start to write for centering a line of 60 strokes.

The first step of this calculation may be omitted since the total number of positions can be read on the typewriter scale adjacent the right edge of the paper when the left edge of the paper is inserted in the typewriter at zero.

Another method which permits the operator to determine the starting position for centering a line of horizontal matter may be quickly made when the exact center of line is known. Set the hairline Z at known center point on scale B. For purposes of illustration suppose such center to be 43. Next move the slide Y so that 60 on scale C, the number of strokes to be centered in this problem, rests directly under the hairline. The index of scale C points to position 13 on scale B, thus indicating the starting position to write a line of 60 positions having the center of such line at 43.

Vertical calculations

When the slide rule is closed, as shown in Fig. 1, the operator may determine how many lines of typewriting may be placed on a sheet of paper by measuring the length of paper and setting the hairline Z of the runner at this position on scale A and reading directly on scale E.

Let it be assumed that the vertical length of the paper to be used measures 6½ inches and it is desired to type twenty-one lines of material on this piece of paper and these twenty-one lines must be centered vertically.

The paper is measured with a ruler or by scale A on the slide rule and found to be 6½ inches. The hairline is then set at this mark on scale A.

Since there are twenty-one lines to be written, the slide is moved until the secondary mark 21 of the E scale is under the hairline, as shown in Figure 3. The answer 9 on the F scale is read opposite the index of the E scale. The operator then rolls the platen to space the paper nine lines from the top edge thereof and after calculating the margin as directed previously, the twenty-one lines to be copied will be centered vertically as well as horizontally on the paper.

Ordinarily the spacing of titles or headings from the body of the typewritten matter does not involve calculations because set rules are followed. Thus when the lines of the body of the typewritten matter are singly spaced the sub-headings and paragraphs are usually set at a double spacing therefrom and a double or triple spacing is employed for setting the main heading above the first sub-heading. Again, if the body of the material is double spaced the sub-headings and paragraphs are ordinarily triple spaced and the main heading is set at quadruple spacing. Thus the typist knows how many spaces to add to the body of the material for each heading, sub-heading, or paragraphs when copying or setting up typewritten matter, and the problem of centering the material vertically is then merely a matter of equalizing the space at the top and bottom of the sheet or page.

If the sheet is to be filed by fastening adjacent the top or bottom and the subject matter is to be centered relative to the bound sheet, then the available line positions on the sheet should be reduced in accordance with the number of lines required for binding the top or bottom of the sheet as the case may be and the problem of centering is calculated from the number of lines available on the bound sheet.

Addition and subtraction

Problems of addition and subtraction can be manipulated on the slide rule by using the duplicate scales B and D. Calculations of this character are particularly advantageous for use with problems containing a series of spaced columns across the page where it is desired to finish one column of a few lines before proceeding to the next adjacent column or for setting up the columns by typing the first line thereof. Let it be assumed that a typewriter having elite type is to be used for setting up the problem comprising four columns of 12 positions, 5 positions, 10 positions and fourteen positions respectively, each figure representing the longest item of each column. There is a total of 41 positions in the four columns which permit the selection of approximately 5 spaces between each column to properly set them out. With four columns there are three separations of 5 spaces each making 15 spaces in all and 56 positions in all for each line in the four columns. If the left edge of the paper is placed at zero on the typewriter scale and it is 8½ x 11, the hair line Z, of the slide rule, such as shown in Fig. 4, is placed over 8½ in scale A. Scale B indicates that there are 102 available positions in elite type and when the slide Y is moved to the left until 56 of scale D is under the hairline then the lower arrow head index of scale D indicates on scale G that the first column should be started at 23 of the typewriter scale.

The slide Y is then moved until the upper index of scale D points to 23 on scale B, the starting point or left marginal stop. The 12 positions of the first column are added by moving the runner until the hairline is over 12 on scale D and the reading of 35 is observed under the hairline on scale B using a rule such as shown in Fig. 4. The index on scale D is then advanced to 35 and the runner is in turn advanced to place the hairline over 5 on scale D. The hairline reading on scale B is then 40 which is the starting position or tabular stop setting of the second column.

The index of scale D is then advanced to 40 and the hairline to 5 on D giving a reading of 45 on B. When the second column is typed the index is advanced to 45 and the hairline to 5 on D which reads 50 on B, the beginning of the third column or the setting for the second tabular stop. The index is then advanced to 50 and the hairline to 10 on D which reads 60 on B, the reading at the end of the third column. After the index is advanced to 60 on B and the hairline to 5 on D the reading on B under the hairline is 55 or the starting position of the fourth and last column or the third tabular stop setting. This column is 14 spaces long. The index is then advanced to 65 on B and the hairline to 14 on D. The reading on B under the hairline is 79, which is the right marginal stop setting and is 23 spaces from the available number of positions on a sheet of paper 8½" wide. Thus the margins at each side of the four columns are 23 spaces each and there are 5 spaces intermediate each of the columns.

*Left and right margins*

The most popular sizes of paper used in stenographic work are 8 or 8½ inches wide and the typist ordinarily sets the paper guide at zero on the typewriter scale. This setting provides uniformity of paper insertion in the machine. The typist then knows that the center of the paper on the typewriter scale is 40 and 43 respectively for pica type and 48 and 51 for elite type. Thus with the center of the paper known the left and right margins of a line of a given number of characters and spaces may be quickly calculated by using these center points with the B and C scales as stated in one of the previous problems. On the other hand these same margins may be calculated by using the full width of the paper with the B, D and G scales as previously pointed out in the first problem. Knowing the left and right margins the typist can quickly set the tabulators on the machine and the work can be neatly retained between these margins.

Assuming that the sheet is 8½ inches wide, the typewriter has pica type and the subject matter is to be written in lines having 55 characters and spaces, then the hairline Z may be placed over 8½ on scale A or 85 on scale B and the slide Y moved to the right until 55 on scale D is under the hairline. The answer is read on scale G opposite the lower arrow head index of scale D as 15. In other words the left margin should be 15 spaces from the left edge of the paper to center the line of 55 positions. By again moving the slide Y until 15 on scale D comes under the hairline which was left at 85 on scale B, then the upper index of scale D points to 70 on scale B which is the right tabular setting for the right margin. If dimensions of the paper frequently change, this simple marginal calculation may be readily made for the different sizes of paper and the work will appear substantially the same.

After the left and right margins are determined then the calculations of typewritten matter together with columns of figures may be made with the B and D scales on either the pica or elite slide rules as the problem is merely a matter of computation of points between fixed points.

This slide rule may be mounted on the front frame or shell of a typewriter by providing holes in the body X of the slide rule as indicated by the holes shown in Figs. 2 and 3 and inserting flat headed screws to fasten the rule to the machine. In this manner the body of the rule is held stationary and the operator may easily manipulate the slide and the runner to work the problems on the machine.

I claim:

1. A slide rule for calculating the setup of typewritten matter which comprises a body member and a slide member movable relative thereto, one member having a linear progressive scale starting from zero and of the modulus of $x$ and a second like progressive scale of the modulus of $2x$, the other member having a linear progressive scale starting from zero and of the modulus of $2x$ and a second like progressive scale of the modulus of $4x$, the zero indication on all of the scales being in alignment in one position of the slide member relative to the body member.

2. A slide rule for calculating the setup of typewritten matter which comprises a body member and a slide member movable relative thereto, one member having a linear progressive scale starting from zero and of the modulus of $y$, the other member having a linear progressive scale starting from zero and of the modulus of $2y$ and a second like progressive scale of the modulus of $6y$, the zero indication on all of the scales being in alignment in one position of the slide member relative to the body member.

3. A slide rule for calculating the set up of typewritten matter which comprises a body member and a slide member movable relative thereto, one member having a linear progressive scale starting from zero and of the modulus of $2x$ and a second like progressive scale of the modulus of $4x$, the other member having a linear progressive scale starting from zero and of the modulus of $2x$, the zero indication on all of the scales being in alignment in one position of the slide member relative to the body member.

4. The structure of claim 3 which also includes on said one member a third linear progressive scale starting from zero and having a modulus which is a multiple of the modulus of the first scale and different from the moduli of the other two scales on said members.

5. A slide rule for calculating the set up of typewritten matter which comprises a body member and a slide member movable relative thereto, one member having a linear progressive scale starting from zero and of a modulus of $2x$, the other member having a linear progressive scale starting from zero and of a modulus of $4x$ and a second like progressive scale of the modulus which is a multiple of the modulus of the first scale on said other member and different from the modulus of the scale on said one member, the zero indication on all of the scales being in alignment in one position of the movable scale.

HARRY A. FREEDLANDER.